US008577755B2

(12) United States Patent
Wiesinger

(10) Patent No.: US 8,577,755 B2
(45) Date of Patent: Nov. 5, 2013

(54) METHOD AND SYSTEM OF LISTING ITEMS

(75) Inventor: Guenter Wiesinger, Landau (DE)

(73) Assignee: eBay Inc., San Jose, CA (US)

( * ) Notice: Subject to any disclaimer, the term of this patent is extended or adjusted under 35 U.S.C. 154(b) by 1254 days.

(21) Appl. No.: 11/965,188

(22) Filed: Dec. 27, 2007

(65) Prior Publication Data

US 2009/0171680 A1 Jul. 2, 2009

(51) Int. Cl.
*G06Q 30/00* (2012.01)
(52) U.S. Cl.
USPC .......................... 705/27.1; 705/26.1
(58) Field of Classification Search
USPC ............................. 705/26.1–27.2
See application file for complete search history.

(56) References Cited

U.S. PATENT DOCUMENTS

| 5,642,502 A * | 6/1997 | Driscoll .................. 1/1 |
| 2001/0044758 A1* | 11/2001 | Talib et al. ................ 705/27 |
| 2001/0056396 A1* | 12/2001 | Goino ..................... 705/37 |
| 2003/0204447 A1* | 10/2003 | Dalzell et al. ............. 705/26 |
| 2008/0208713 A1* | 8/2008 | Vadlamani ............... 705/27 |

OTHER PUBLICATIONS

By, J. S. (Jun. 17, 1996). Technology (A special report): Let the buying begin—making the sale: The allure of on-line commerce, its proponents argue, will eventually prove overwhelming. Wall Street Journal.*

* cited by examiner

*Primary Examiner* — Resha Desai
(74) *Attorney, Agent, or Firm* — Schwegman Lundberg & Woessner, P.A.

(57) ABSTRACT

Described herein are a method and a system to suggest information for one or more items offered for sale by sellers in a network-based market place. One or more keywords associated with an item to be listed may be received from a seller. The one or more keywords may be used to search for matching information stored in a database. The matching information may be presented to the seller to be selected. When the seller modifies the suggested matching information, the modified version of the matching information may be stored in the database.

16 Claims, 12 Drawing Sheets

KEYWORDS TABLE —355

| KEYWORD IDENTIFICATION FIELD —370 | KEYWORD FIELD —375 |
|---|---|
| 1 | NIKE |
| 2 | SNEAKER |
| 3 | IPOD |
| 4 | USED |
| 5 | SIZE |
| 6 | APPLE |
| 7 | DELL |
| 8 | BRAND NEW |

DESCRIPTION TABLE —360

| DESCRIPTION IDENTIFICATION FIELD —385 | DESCRIPTION FIELD —390 |
|---|---|
| 1 | HONDA PRELUDE 2 DOORS |
| 2 | RED NIKE BASKETBALL SNEAKERS |
| 3 | IPOD, SLIGHTLY USED, GOOD |
| 4 | USED, BUT GOOD CONDITION |
| 5 | SIZE A, AA, AAA |
| 6 | APPLE IPHONE + ACCESSORIES |
| 7 | DELL LAPTOP LATITUDE BRAND NEW |
| 8 | DELL RECHARGEABLE BATTERIES USED |
| 9 | NIKE VOLLEYBALL SNEAKERS, SIZE 8 |
| 10 | APPLE 100 SONGS DOWNLOAD |

*FIG. 3B*

METHOD AND SYSTEM OF LISTING ITEMS

FIELD

The disclosed subject matter relates generally to the technical field of data processing and, in one example embodiment, to a system to list items in an electronic publishing and/or sales system.

BACKGROUND

Information items may be offered for sale using Internet web sites. The items may be offered for sale in an auction-format or in a fixed-price-format. There may be many items. Potential sellers may visit the web sites and list items that they may be interested in selling. Some sellers may be occasional sellers and may only a few items to sell. Other sellers may sell hundreds or thousands of items. These sellers may be referred to as power sellers. It may be advantageous to provide a listing system to enable a seller to quickly list an item, especially when the listing process may be repeated many times.

BRIEF DESCRIPTION OF THE DRAWINGS

Embodiments are illustrated by way of example and not limitation in the figures of the accompanying drawings, in which like references indicate similar elements and in which:

FIG. 3B illustrates examples of a keywords table and a description table, in accordance with some embodiments.

DETAILED DESCRIPTION

According to one example embodiment, a method and a system includes using one or more keywords to suggest information that may be used to list an item in an online system. The suggested information may be retrieved from a database.

Other features will be apparent from the accompanying drawings and from the detailed description that follows. In the following description, for purposes of explanation, numerous specific details are set forth in order to provide a thorough understanding of embodiments. It will be evident, however, to one skilled in the art that the present description may be practiced without these specific details.

Introduction

Generally, when an item is to be listed for sale in a network-based marketplace, the seller of the item may need to provide description information, title information, price information, shipping information, and so on. These may be referred to collectively as information. When the seller has multiple items to be listed for sale, the process of providing the information can be tedious. In some example embodiments of the present invention, it is noted that similar items may be offered for sale by multiple sellers at various times, and the information provided by these sellers may be similar. The similar information may be stored in a database and may be used to enable the sellers to complete the listing process in a more efficient manner. In the following examples, although "description information" or the like may be used to refer to the information that may be suggested to the sellers, it is to be understood that title information, price information, shipping information, and so on may also be suggested to the sellers.

Platform Architecture

Figure 1:
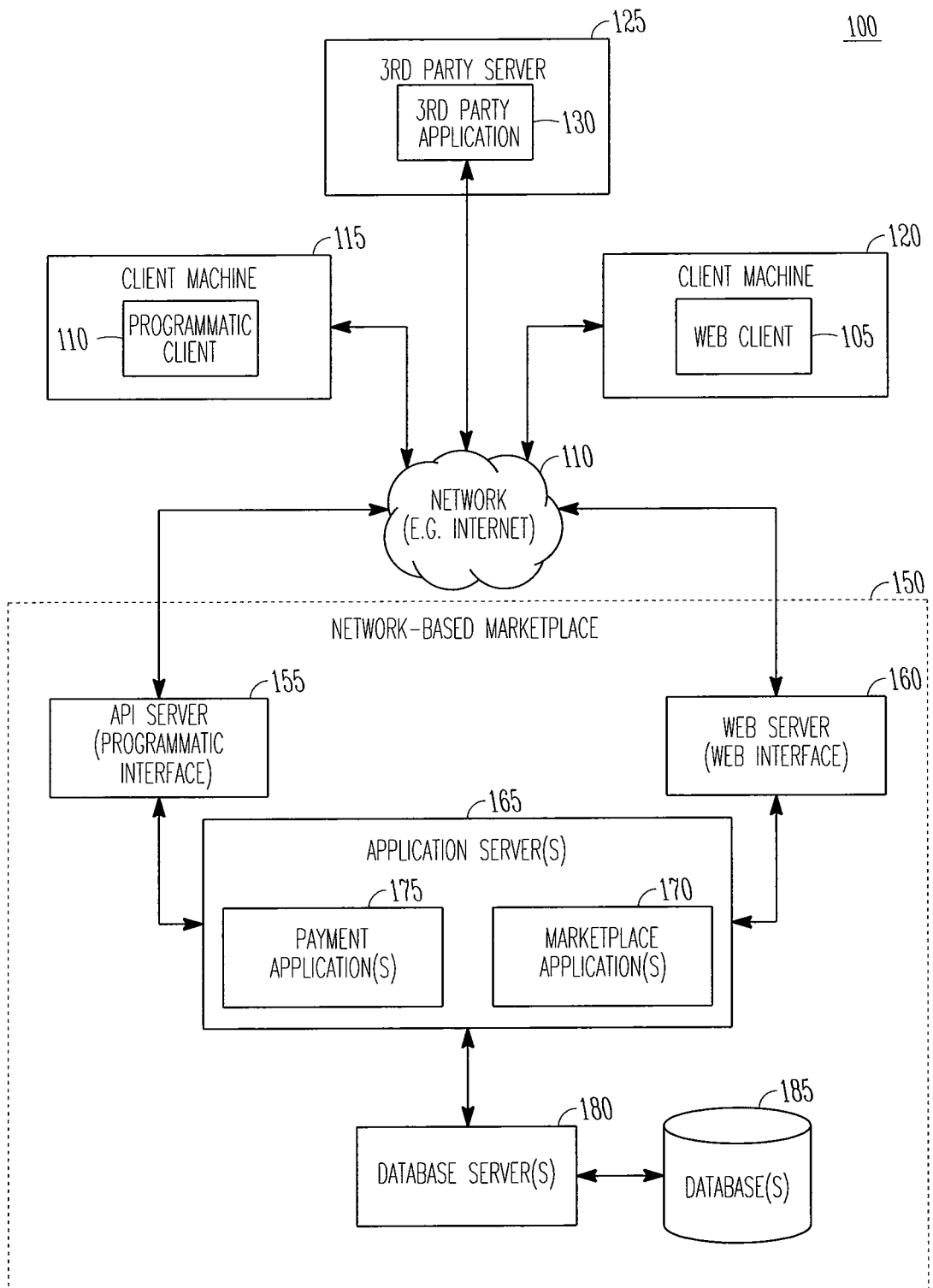
FIG. 1 illustrates an example system diagram that may be used, in accordance with some example embodiments.

FIG. 1 illustrates an example system diagram that may be used, in accordance with some example embodiments. System 100 may include a network and may be implemented using client-server architecture. A commerce platform, in the example form of a network-based marketplace 150, may provide server-side functionality, via network 110 (e.g., the Internet) to one or more clients. FIG. 1 illustrates, for example, a web client 105 (e.g., a browser, such as the Internet Explorer® browser developed by Microsoft® Corporation of Redmond, Wash.), and a programmatic client 110 executing on respective client machines 115 and 120.

The network-based marketplace 150 may include an application program interface (API) server 155 and a web server 160. The concept of API is known to one skilled in the art. The API server 155 and the web server 160 may be coupled to one or more application servers 165. The API server 155 and the web server 160 may provide programmatic and web interfaces to the one or more application servers 165. The application servers 165 may host one or more marketplace applications 170 and one or more payment applications 175. The application servers 165 may be coupled to one or more database servers 180 that facilitate access to information stored in one or more databases 185.

For some example embodiments, the marketplace applications 170 may provide a number of marketplace functions and services to users that access the network-based marketplace 150. The payment applications 175 may provide a number of payment services and functions to the users. The payment applications 175 may allow the users to quantify and accumulate value (e.g., in a commercial currency, such as the U.S. dollar, or a proprietary currency, such as "points") in accounts, and then later to redeem the accumulated value for products (e.g., goods or services) that are made available via the marketplace applications 170.

In the current example, the marketplace applications 170 and the payment applications 175 are shown in FIG. 1 to both form part of the network-based marketplace 150. It will be appreciated that, in alternative example embodiments, the payment applications 175 may form part of a payment service that is separate and distinct from the network-based marketplace 150.

In the current example, the system 100 shown in FIG. 1 employs client-server architecture. It will be appreciated that the example embodiments are of course not limited to such architecture and could equally well find applications in a distributed or peer-to-peer architecture. The marketplace applications 170 and payment applications 175 may also be implemented as standalone software programs, which do not necessarily have networking capabilities.

The web client 105 may access services and functions provided by the marketplace applications 170 and the payment applications 175 via the web interface supported by the web server 160. Similarly, the programmatic client 110 may access services and functions provided by the marketplace applications 170 and the payment applications 175 via the programmatic interface provided by the API server 155. The programmatic client 110 may, for example, be a seller application (e.g., the TurboLister application developed by eBay Inc., of San Jose, Calif.) to enable sellers to author and manage listings on the network-based marketplace 150 in an off-line manner and to perform batch-mode communications between the programmatic client 110 and the network-based marketplace 150.

FIG. 1 also illustrates a third party application 130, executing on a third party server machine 125, as having programmatic access to the network-based marketplace 150 via the programmatic interface provided by the API server 155. For example, the third party application 130 may, utilizing information retrieved from the network-based marketplace 150, support one or more features or functions on a website hosted by a third party, referred to as a third party website. The third party website may, for example, provide one or more promotional, marketplace or payment functions that are supported by the relevant applications of the network-based marketplace 150.

Marketplace Application(s)

Figure 2:
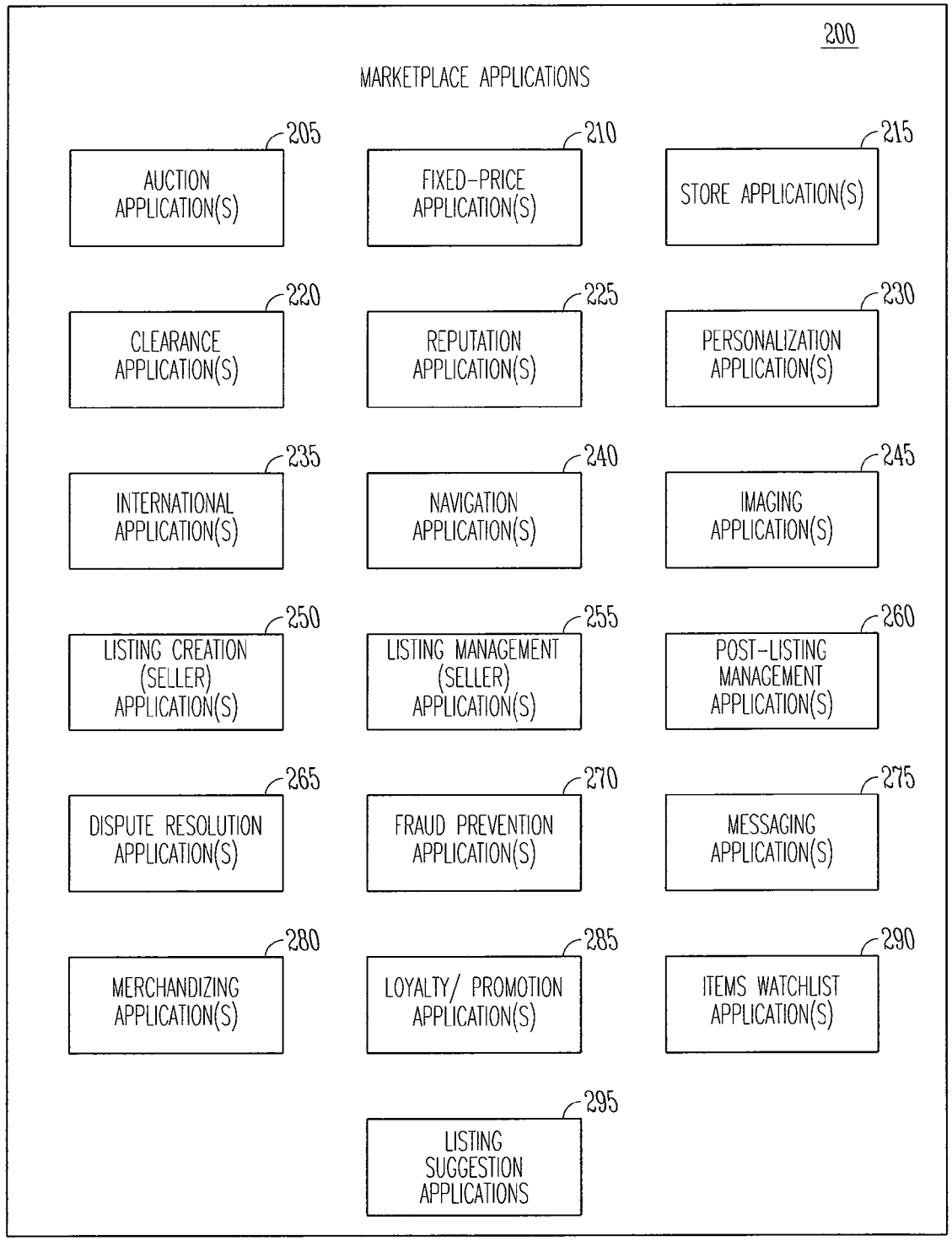
FIG. 2 illustrates an example block diagram showing multiple marketplace applications that may be provided as part of a network-based marketplace, in accordance with some example embodiments.

FIG. 2 illustrates an example block diagram showing multiple marketplace applications that may be provided as part of a network-based marketplace, in accordance with some example embodiments. The network-based marketplace 150 may include various market place applications 200. The marketplace applications 200 may be related to the marketplace applications 170 illustrated in FIG. 1 and may replace the marketplace applications 170 in some example embodiments.

The marketplace applications 200 may provide a number of listing and price-setting mechanisms whereby a seller may list goods or services for sale, a buyer can express interest in or indicate a desire to purchase such goods or services, and a price can be set for a transaction pertaining to the goods or services.

The marketplace applications 200 may include one or more auction applications 205 which support auction-format listing and price setting mechanisms (e.g., English, Dutch, Vickrey, Chinese, Double, Reverse auctions, etc.). The various auction applications 205 may also provide a number of features in support of such auction-format listings, such as a reserve price feature whereby a seller may specify a reserve price in connection with a listing and a proxy-bidding feature whereby a bidder may invoke automated proxy bidding.

The marketplace applications 200 may include one or more fixed-price applications 210. The fixed-price applications 210 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that may be higher than the starting price of the auction.

The marketplace applications 200 may include one or more store applications 215. The store applications 215 may allow sellers to group their listings within a "virtual" store, which may be branded and otherwise personalized by and for the sellers. Such a virtual store may also offer promotions, incentives and features that are specific and personalized to a relevant seller.

The marketplace applications 200 may include one or more clearance applications 220 which may support clearance-format listing in a clearance section of the publication/sales system and price setting mechanisms. The various clearance applications 220 may also provide a number of features in support of such clearance-format listings. The clearance applications 220 may support fixed-price formats (e.g., the traditional classified advertisement-type listing or a catalogue listing) and buyout-type listings. For example, the clearance item may be bought for a fixed price via instant online payment in the payment application(s) 175.

The items listed in a clearance section may be set at a fixed price by the seller, in a manner similar to the fixed-price applications 210 described above. The fixed price of the item in the clearance section may be reduced over time if the item remains unsold, as designated by the seller, for example. For example, the price of the item in clearance may be reduced by a designated percentage or amount after a designated number of days have passed. The price of the item in clearance may be reduced multiple times. The price may be reduced until the item is sold or the price of the item reaches a lower limit as defined by the seller, for example. For items that are transferred from the auction section to the clearance section, the fixed price may be less than at least one of the auction listing price and the auction reserve price. The fixed price of the clearance application(s) 220 may be less than the fixed price of the fixed-price application(s) 210, if any. The items listed in the clearance section may be offered for sale for an extended duration, as defined by the seller for example.

The clearance applications 220 may not be generally offered in conjunction with an auction-format listing. The clearance applications 220 may allow a buyer to purchase goods or services for a fixed-price that may be priced at or below market value.

The marketplace applications 220 may include one or more reputation applications 225. The reputation applications 225 may allow parties that transact utilizing the network-based marketplace 150 to establish, build, and maintain reputations, which may be made available and published to potential trading partners. Consider that where, for example, the network-based marketplace 150 supports person-to-person trading, users may have no history or other reference information whereby the trustworthiness and credibility of potential trading partners may be assessed. The reputation applications 225 may allow a user, for example through feedback provided by other transaction partners, to establish a reputation within the network-based marketplace 150 over time. Other potential trading partners may then reference such a reputation for the purposes of assessing credibility and trustworthiness.

The marketplace applications 200 may include one or more personalization applications 230. The personalization applications 230 may allow users of the network-based marketplace 150 to personalize various aspects of their interactions with the network-based marketplace 150. For example a user may, utilizing an appropriate personalization application(s) 230, create a personalized reference page at which information regarding transactions to which the user is (or has been) a party may be viewed. Further, a personalization application 230 may enable a user to personalize listings and other aspects of their interactions with the network-based marketplace 150 and other parties.

For some example embodiments, the marketplace applications 200 may include international application(s) 235. The international application(s) 235 may be used by the network-based marketplace 150 to support a number of marketplaces that are customized for specific geographic regions. For example, there may be a version of the network-based marketplace 150 customized for the United Kingdom, and there may be another version of the network-based marketplace 150 customized for the United States. Each of these versions may operate as an independent marketplace, or they may be customized (or internationalized) presentations of a common underlying marketplace.

For some example embodiments, the marketplace application 200 may include navigation applications 240 to facilitate navigating of the network-based marketplace 150. For example, the navigation applications 240 may include a search module and a browse module. The search module may enable keyword searches of listings published via the network-based marketplace 150. The browse module may allow users to browse various category, catalogue, or inventory data structures according to which listings may be classified within the network-based marketplace 150. Various other navigation applications modules may be provided to supplement the search and browse modules.

In order to make listings, available via the network-based marketplace 150, as visually informing and attractive as possible, the marketplace applications 200 may include one or more imaging applications 245. Users may upload images for inclusion within listings. An imaging application 245 may also operate to incorporate images within viewed listings. The imaging applications 245 may also support one or more promotional features, such as image galleries that are presented to potential buyers. For example, sellers may pay an additional fee to have an image included within a gallery of images for promoted items.

For some example embodiments, the marketplace applications 200 may include one or more listing creation applications 250. The listing creation applications 250 may allow sellers conveniently to author listings pertaining to goods or services that they wish to transact via the network-based marketplace 150. As will be described in more details, the listing creation applications 250 may include modules that enable suggestions of item descriptions, in some example embodiments.

For some example embodiments, the marketplace applications 200 may include listing management applications 255 to allow sellers to manage such goods or services listings. Specifically, where a particular seller has authored and/or published a large number of listings, the management of such listings may present a challenge. The listing management applications 255 may provide a number of features (e.g., auto-relisting, inventory level monitors, etc.) to assist the seller in managing such listings.

One or more post-listing management applications 260 also assist sellers with a number of activities that typically occurs post-listing. For example, upon completion of an auction facilitated by one or more auction applications 205, a seller may wish to leave feedback regarding a particular buyer. To this end, a post-listing management application 260 may provide an interface to one or more reputation applications 225, so as to allow the seller conveniently to provide feedback regarding multiple buyers to the reputation applications 225. As another example, upon completion of an auction where the goods or services has not sold, the item may automatically be relisted in the auction application(s) 205 and/or the fixed-price application(s) 210, or the item may be automatically listed in the clearance application(s) 220.

The marketplace applications 200 may include dispute resolution applications 265. The dispute resolution applications 265 provide mechanisms whereby disputes arising between transacting parties may be resolved. For example, the dispute resolution applications 265 may provide guided procedures whereby the parties are guided through a number of steps in an attempt to settle a dispute. In the event that the dispute cannot be settled via the guided procedures, the dispute may be escalated to a third party mediator or arbitrator.

The marketplace applications 200 may include fraud prevention applications 270. A number of fraud prevention applications 270 implement various fraud detection and prevention mechanisms to reduce the occurrence of fraud within the network-based marketplace 150.

The marketplace applications 200 may include messaging applications 275. The messaging applications 275 are responsible for the generation and delivery of messages to users of the network-based marketplace 150. Such messages, for example, advise users regarding the status of listings at the network-based marketplace 150 (e.g., providing "outbid" notices to bidders during an auction process or to provide promotional and merchandising information to users).

The marketplace applications 200 may include merchandising applications 280. The merchandising applications 280 may support various merchandising functions that are made available to sellers to enable sellers to increase sales via the network-based marketplace 150. The merchandising applications 280 also operate the various merchandising features that may be invoked by sellers, and may monitor and track the success of merchandising strategies employed by sellers.

The network-based marketplace 150 itself, or one or more parties that transact via the network-based marketplace 150, may operate loyalty programs that are supported by one or more loyalty/promotions applications 285. For example, a buyer may earn loyalty or promotions points for each transaction established and/or concluded with a particular seller, and may be offered a reward for which accumulated loyalty points can be redeemed.

The marketplace applications 200 may include items watch list applications 290. The items watch list applications 290 may support various functions related to watching for items made available by the auction applications 205, the fixed price applications 210, the clearance applications 220, and any other applications that may make available merchandises and/or services so that they can be purchased by the buyers via the network-based marketplace 150. The items watch list applications 290 may provide various functions including functions that enable the buyers to watch, monitor, keep track, rank, provide notes, and highlight one or more items that the buyers may be interested in buying.

The marketplace applications 200 may include listing suggestion applications 295. The listing suggestion applications 295 may suggest information that may be used by a seller to list an item. The listing suggestion applications 295 may supplement or replace various functions performed by the listing creation applications 250. Alternatively, the listing suggestion applications 295 may provide functions independent of the functions performed by the listing creation applications 250. For example, the listing suggestion applications 295 may fully or partially automate certain listing creation functions normally performed by the listing creation applications 250.

Even though the context of this description is with regard to marketplace applications, it is to be understood by those of skill in the art that the described subject matter may also be applicable to other types of applications for various types of transactions. The transactions may include those between a single seller and a single buyer or may include those between a single seller and multiple buyers, and may include selling a catalog-type product, or even a more unique product. It may also be noted that although the description may refer to a seller or a buyer in commerce or marketplace environments, certain aspects of the description may also be applicable to non-commerce environments.

Data Structures

Figure 3A:
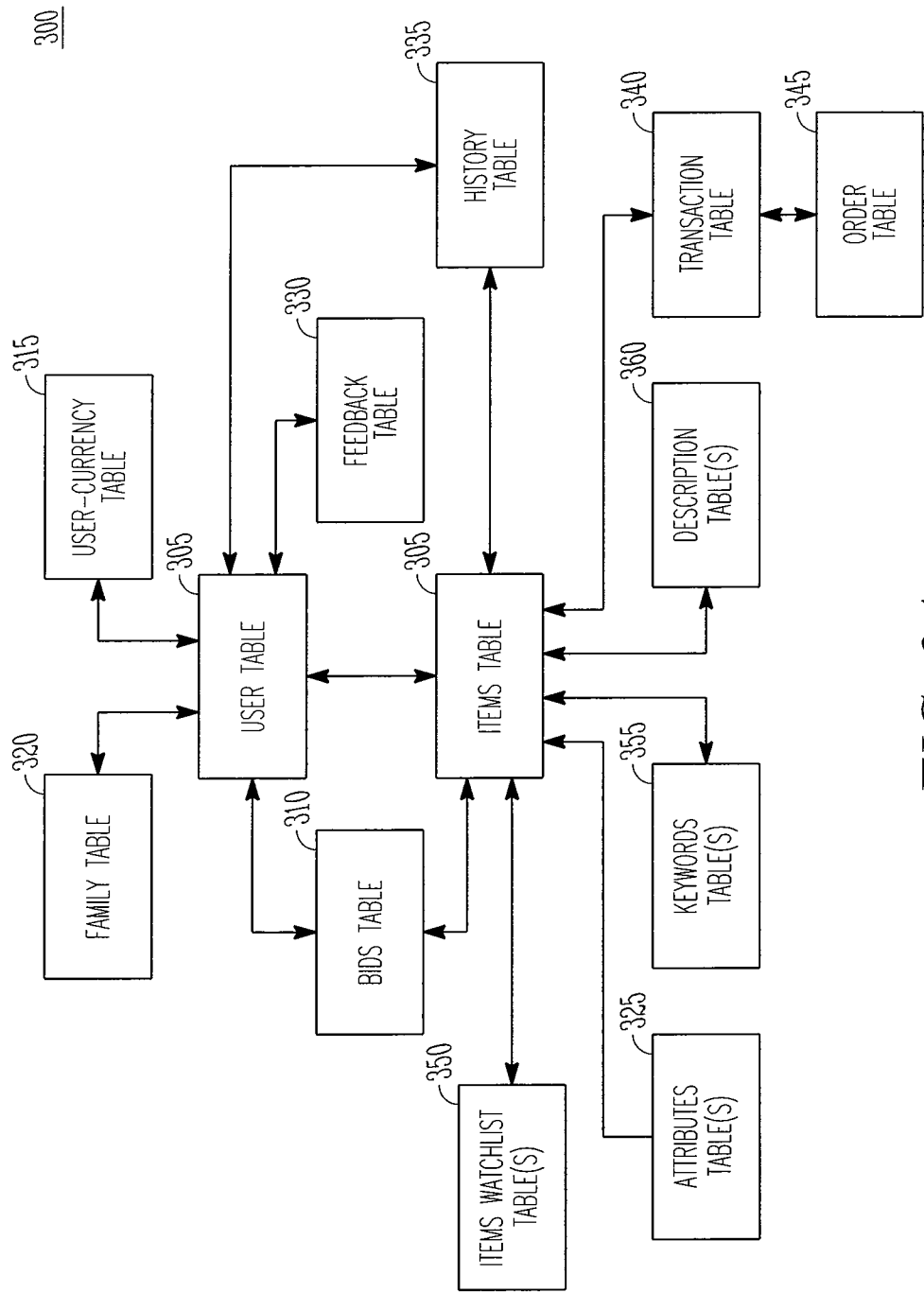
FIG. 3A illustrates an example entity-relationship diagram, illustrating various tables that may be used, in accordance to some example embodiments.

FIG. 3A illustrates an example entity-relationship diagram, illustrating various tables that may be used, in accordance to some example embodiments. Tables 300 may be maintained in the databases 185 and may be utilized by and may support the marketplace applications 170 and the payment applications 175 (illustrated in FIG. 1).

The tables 300 may include a user table 301. The user table 301 may contain a record for each registered user of the network-based marketplace 150. The user table 301 may also include identifier, address and financial instrument information pertaining to each such registered user. A user may operate as a seller, a buyer, or both, within the network-based marketplace 150. In an example embodiment, a buyer may be a user that has accumulated value (e.g., commercial or proprietary currency), and is then able to exchange the accumulated value for items that are offered for sale by the network-based marketplace 150.

The tables 300 may also include an items table 305 in which are maintained item records for goods and services that are available to be, or have been, transacted via the network-based marketplace 150. Each item record within the items table 305 may furthermore be linked to one or more user records within the user table 301, so as to associate a seller and one or more actual or potential buyers with each item record.

The tables 300 may include a transaction table 340. The transaction table 340 may contain a record for each transaction (e.g., a purchase transaction) pertaining to items for which records exist within the items table 305.

The tables 300 may include an order table 345. The order table 345 may be populated with order records, each order record being associated with an order. Each order may be associated with one or more transactions for which records may exist within the transactions table 340.

The tables 300 may include a bids table 310. Bid records within the bids table 310 each relate to a bid received at the network-based marketplace 150 in connection with an auction-format listing supported by the auction application(s) 205.

The tables 300 may include a feedback table 330. The feedback table 330 may be utilized by one or more reputation applications 225, in some example embodiments, to construct and maintain reputation information concerning users.

The tables 300 may include a history table 335. The history table 335 may maintain a history of transactions to which a user has been a party.

The tables 300 may include one or more attributes tables 325. The attributes tables 325 may record attribute information pertaining to items for which records exist within the items table 305. Considering a single example of such an attribute, the attributes tables 325 may indicate a currency attribute associated with a particular item. The currency attribute may identify the currency of a price for the relevant item as specified by a seller.

Family table 320 and user-currency table 315 may be used to support related products and multiple currencies in transactions.

The tables 300 may include items watch list tables 350. The items watch list tables 350 may include information pertaining to items for which the buyers may be interested in but may not yet be ready to engage into a transaction with the seller of the item. For example, the buyer may be shopping for a similar time but want to wait for a better price, quality, etc. In these situations, the buyer may select an option (e.g., watch this item selection) to place information associated with the item into a list of items to watch (also referred to as a watch list).

The tables 300 may include keywords tables 355. The keywords tables 355 may include keywords that may be used to describe an item to be listed.

The tables 300 may include description tables 360. The description tables 360 may include descriptions that may be used to describe an item. The keywords tables 355 and the description tables 360 may also be used to suggest information that may be used by a seller to list an item.

FIG. 3B illustrates examples of a keywords table and a description table, in accordance with some embodiments. In this example, the keywords table 355 may include two fields, keyword identification field 370 and keyword field 375. For some example embodiments, each of the values of the keyword identification field 370 may be unique. For some other example embodiments, each of the values of the keyword field 375 may be a single word or a phrase containing two or more words. For example, a keyword in the keyword field 375 may be "apple", or it may be "brand new", as illustrated with the keywords table 355. Each pair of keyword identification and its corresponding keyword (e.g., "1" and "Nike") may be referred to as a record. In the current example, the keywords table 355 may include eight records.

The description table 360 may include two fields, description identification field 385 and description field 390. For some example embodiments, each of the values of the description identification field 385 may be unique. For some other example embodiments, a value of the description field 390 may be one or more of a single word, a phrase containing two or more words, a sentence, multiple sentences, a paragraph, multiple paragraphs, HyperText Markup Language (HTML) link, images, and prices. For example, an item description may be written in HTML to use different formatting and inclusions of links and images. When an image is used, the image may be tagged with keywords and may be suggested. When a price is used, the price may include shipping costs, start price, etc. Each pair of description identification and description (e.g., "2" and "Red Nike Basketball sneakers") may be referred to as a record. In the current example, the description table 360 may include ten records.

Figure 3C:
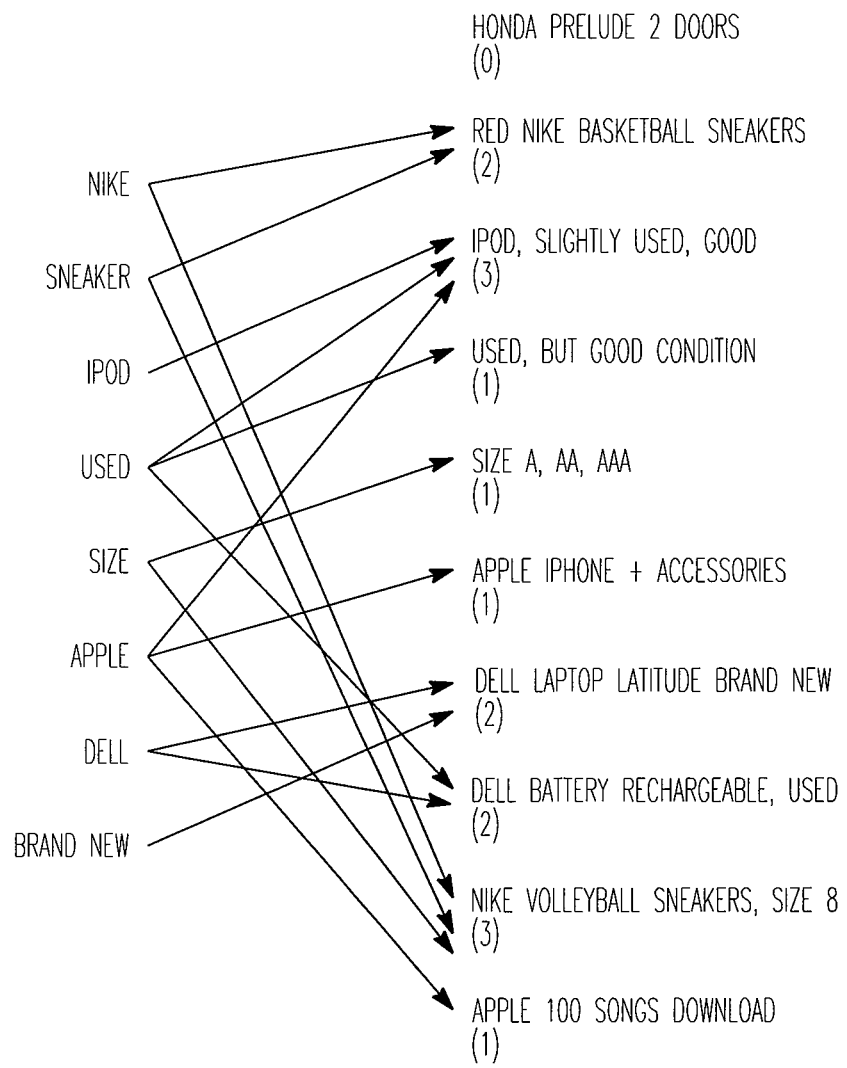
FIG. 3C illustrates examples of relationships among entries in a keywords table and entries in a description table, in accordance with some embodiments.

FIG. 3C illustrates examples of relationships among entries in the keywords table 355 and entries in the description table 360, in accordance with some embodiments. For some example embodiments, the keywords in the keyword field 375 may be related to the descriptions in the description field 390 in one-to-one, one-to-many, many-to-one, and many-to-many relationships. For example, the keyword "Nike" in the keyword field 375 may be related to two descriptions in the description field 390 in a one-to-many relationship. This is illustrated in FIG. 3C by the two arrows originating from the keyword "Nike". Similarly, the keyword "IPod" in the keyword field 375 may be related to one description in the description field 390 in a one-to-one relationship.

It may be noted that each description in the description field 390 may be related to one or more keywords. For example, the description "Nike volleyball sneakers, size 8" may be related to three keywords "Nike", "Sneaker", and "Size". In the current example, each description in the description field 390 includes a number in parentheses to illustrate the number of relationships with the keywords in the keyword field 375. For example, the description "Dell laptop Latitude brand new" is related to two keywords "Dell" and "Brand New". Other relationship examples are also illustrated in FIG. 3C.

For some example embodiments, the listing suggestion applications 295 may be configured to recognize keywords that may be similar in context. For example, when the keyword "Apple" is provided, the listing suggestion applications 295 may consider it to be similar to "IPhone" which is a product manufactured and sold by Apple Corporation of Cupertino, Calif. Thus, when the keyword "Apple" is provided, the description that includes the keyword "IPhone" may be suggested even though that description may not include the keyword "Apple". For some example embodiments, the similarities of keywords may include similarities in meaning, context, etc.

For some example embodiments, a seller may provide one or more keywords associated with an item and, responsive to receiving the one or more keywords, the listing suggestion applications 295 may suggest information that may be used by the seller to list the item. The information may include description information as described in the example description table 360 in FIG. 3B. For some example embodiments, each description may be associated with a title, and the listing suggestion applications 295 may also suggest one or more of title information, price information, image information, shipping information, and so on. For example, the title information may be stored in a title field of the description table 360.

Figure 3D:
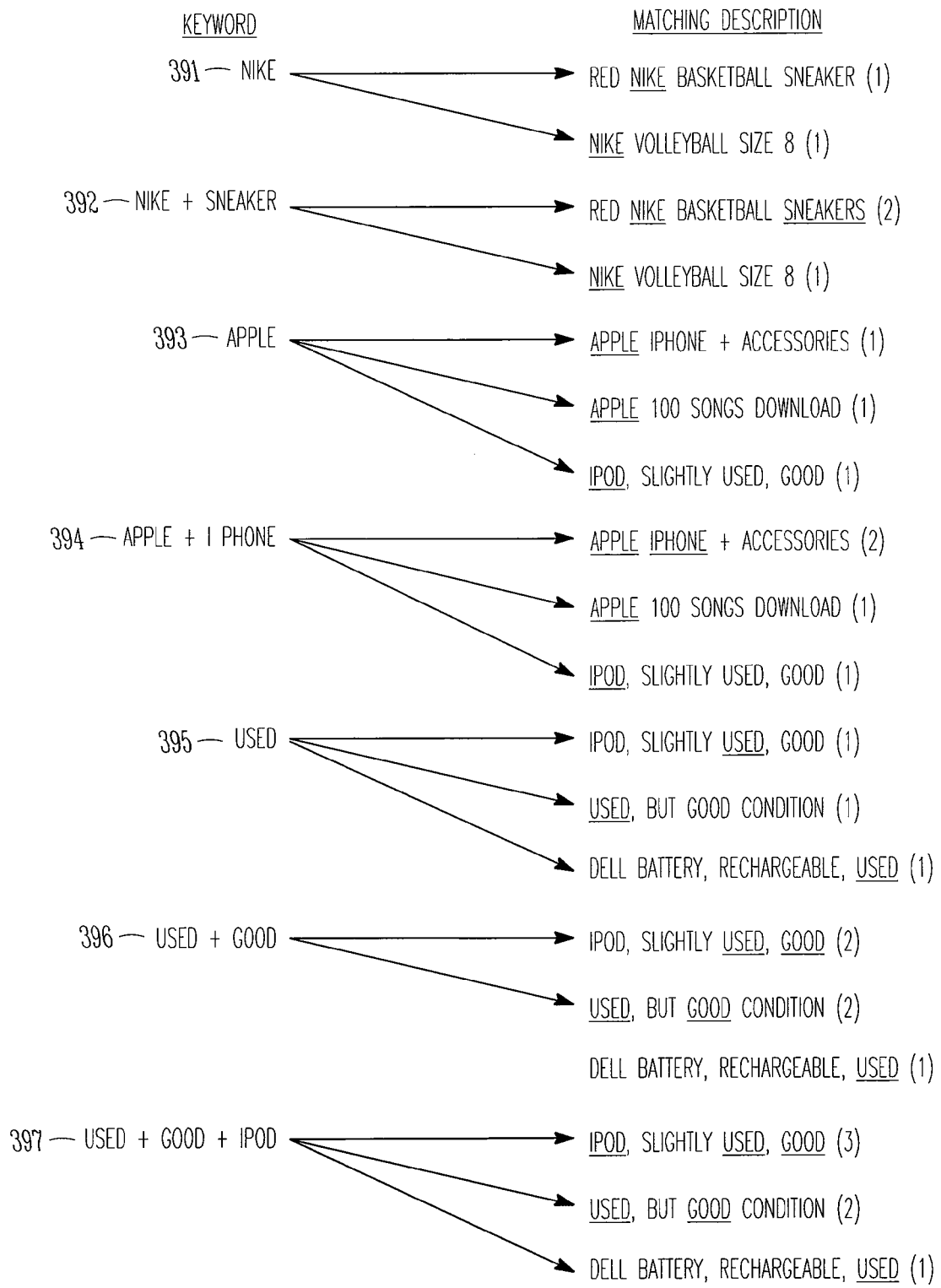
FIG. 3D illustrates examples of keywords that may be provided by a seller and matching information that may be found and suggested by the listing suggestion applications, in accordance with some embodiments.

FIG. 3D illustrates examples of keywords that may be provided by a seller and matching information that may be found and suggested by the listing suggestion applications 295, in accordance with some embodiments. In this example, the left column under "Keyword" includes keyword combinations of one or more keywords, while the right column under "Matching Description" includes one or more matching descriptions that correspond to the keyword combinations in the left column. When the keyword "Nike" 391 is provided by a seller, there may be two matching descriptions in the right column.

Each matching description in the right column in this example includes a number in parentheses to illustrate a number of keyword(s) (illustrated underlined) corresponding to the keywords in the left column. When the keywords "Nike" and "Sneaker" 392 are provided, there are two matching descriptions. Note that the first matching description includes two (2) keywords "Nike" and "Sneakers", whereas the second matching description only includes one (1) keyword "Nike". When the keywords "Used", "good" and "IPod" 397 are provided, there are three matching descriptions. The first matching description includes three (3) keywords "IPod", "used" and "good"; the second matching description includes two (2) keywords "Used" and "good"; the third matching description includes one (1) keyword "used". Other keyword combination examples are included in FIG. 3D to illustrate one to multiple matching descriptions.

It may be noted that the matching descriptions may include one or more sentences.

Listing Suggestion Applications

Figure 4:
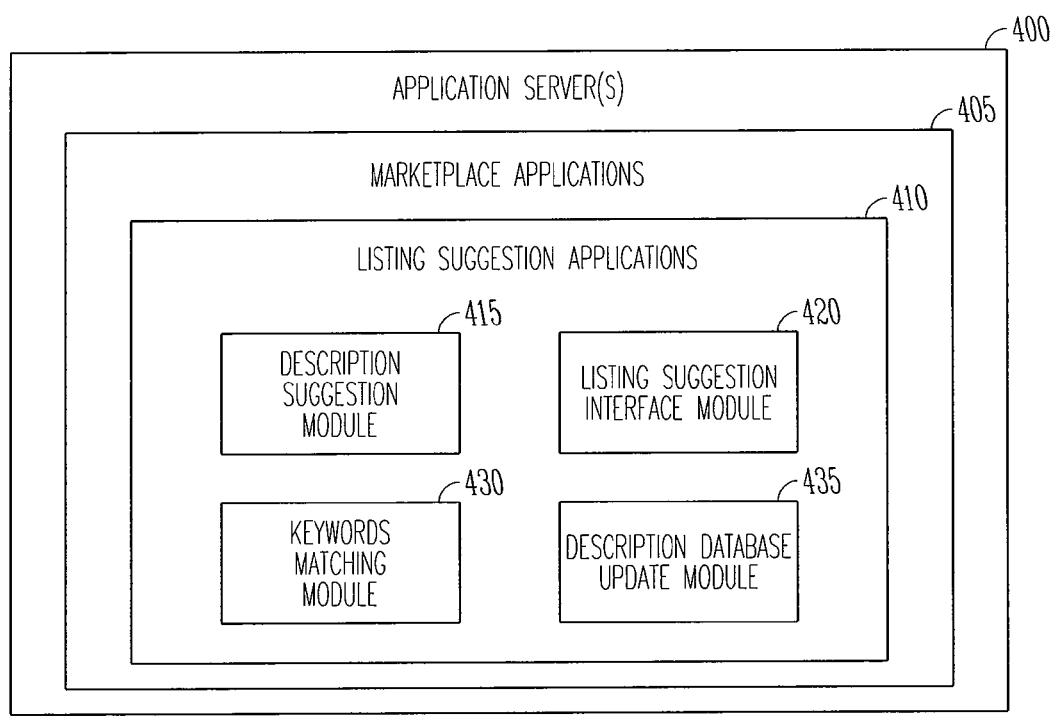
FIG. 4 is an example block diagram that illustrates listing suggestion applications, in accordance with some example embodiments.

FIG. 4 is an example block diagram that illustrates listing suggestion applications, in accordance with some example embodiments. The listing suggestion applications 410 may be part of the marketplace applications 405 which, in turn, may be included in the application servers 400. The application servers 400, the marketplace applications 405, and the listing suggestion applications 410 may be related to the application servers 165 (illustrated in FIG. 1), the marketplace applications 170 (illustrated in FIG. 1) and 200 (illustrated in FIG. 2), and the listing creation applications 250 (illustrated in FIG. 2), respectively, and may replace them in certain environments.

Referring to FIG. 4, for some example embodiments, the listing suggestion applications 410 may include description suggestion module 415, listing suggestion interface module 420, keywords matching module 430, and description database update module 435. Together, these modules may enable a seller to more efficiently create a listing using information that may be stored in a database (e.g., database 185). It maybe noted that the listing suggestion application 410 may also include other modules to suggest title information, price information, shipping information, and so on.

The listing suggestion interface module 420 may cause an interface to be presented to the seller. The interface may be presented using a web browser or any other presentation techniques. For some example embodiments, the interface may include a title input area and a description input area. The interface may also include a keyword input area. Other input areas may also be presented by the listing suggestion interface module 420. For example, there may be a price input area, an image input/upload area, a shipping information input area, and so on.

Keywords and Description Matchings

A seller may provide one or more keywords using the keyword input area. For some example embodiments, when the seller finishes providing the keywords in the keyword input area, the seller may press a soft key or button (e.g., "Suggest") to start getting the suggestions. The suggestions may include a title suggestion and a description suggestion. The title suggestion and the description suggestion may be presented in the respective input areas. For some example embodiments, a minimum number of keywords may be required before the title and/or the description suggestions are presented.

For some example embodiments, multiple descriptions may be suggested, and the user may need to select one description. For example, the user may select a description that either best describes the item or a description that needs minor modification by the seller.

The keywords matching module 430 may be used to search for matching descriptions using the keywords provided by the seller. The keywords table 355 and/or the description table 360 may be used. The keywords matching module 430 may be coupled to the listing suggestion interface module 420. The keywords may be provided by the seller via the keyword input area.

The description suggestion module 415 may be used to suggest a matching description based on the keywords provided by the seller. The description suggestion module 415 may be coupled with the keywords matching module 430 and the listing suggestion interface module 420. The matching description suggested by the description suggestion module 415 may be displayed in the description input area. The description suggestion module 415 may also suggest a title to be displayed in the title input area. The description suggestion module 415 may also suggest other information (price, shipping, etc.) to the seller.

Ranking of Matching Descriptions

For some example embodiments, when there are multiple matching descriptions, the description suggestion module 415 may evaluate each matching description and may present only a subset of the matching descriptions to the user. An algorithm may be used to perform the evaluation to determine the subset. The algorithm may include ranking the matching descriptions based on the number of keywords included in each matching description. For example, a matching description that includes all five keywords entered by the user may be ranked higher (and may be more likely to be selected by the seller) than a matching description that includes four of the five keywords.

For some example embodiments, a weighted value algorithm may be used to rank the matching descriptions. Each keyword may be associated with a weighted value according to an order that they are entered in the keyword input area by the seller. For example, when there is only one keyword that keyword is associated with 100% of the weighted value; when there are two keywords, the first keyword may be associated with 60% of the weighted value and the second keyword may be associated with 40% of the weighted value; when there are three keywords, the order may be 55%, 30%, and 15%, as long as they add up to 100% of the weighted value. Using the three keywords example, a matching description that includes the first keyword may be ranked higher than a matching description that includes the second and third keywords. Other weighted value algorithms may also be used to rank the matching descriptions. For example, one weighted value algorithm may be based on a frequency of use of the keywords provided by the sellers.

Self-Learning Database

Database update module 435 may be used to update the keywords table 355 and the description table 360. The database update module 435 may be associated with the listing suggestion interface module 420. The listing suggestion interface module 420 may suggest one or more of a title, a description, price information and shipping information. It may be possible that the seller may modify the information suggested by the listing suggestion interface module 420. For example, it may be possible that the seller may not like the matching description, the title, the price and/or the shipping information suggested by the description suggestion module 415 and may modify or provide something completely different. For some example embodiments, the database update module 435 may insert the new or modified information (e.g., description, title, price, shipping information) into the description table 460. For some example embodiments, the database update module 435 may also update the keywords table 355 if one or more of the keywords entered by the seller do not exist in the keywords table 355. Thus, the databases 185 may "learn" more keywords and descriptions over time and may eventually be able to suggest matching descriptions that may need minor or no modification from the sellers.

Figure 5:
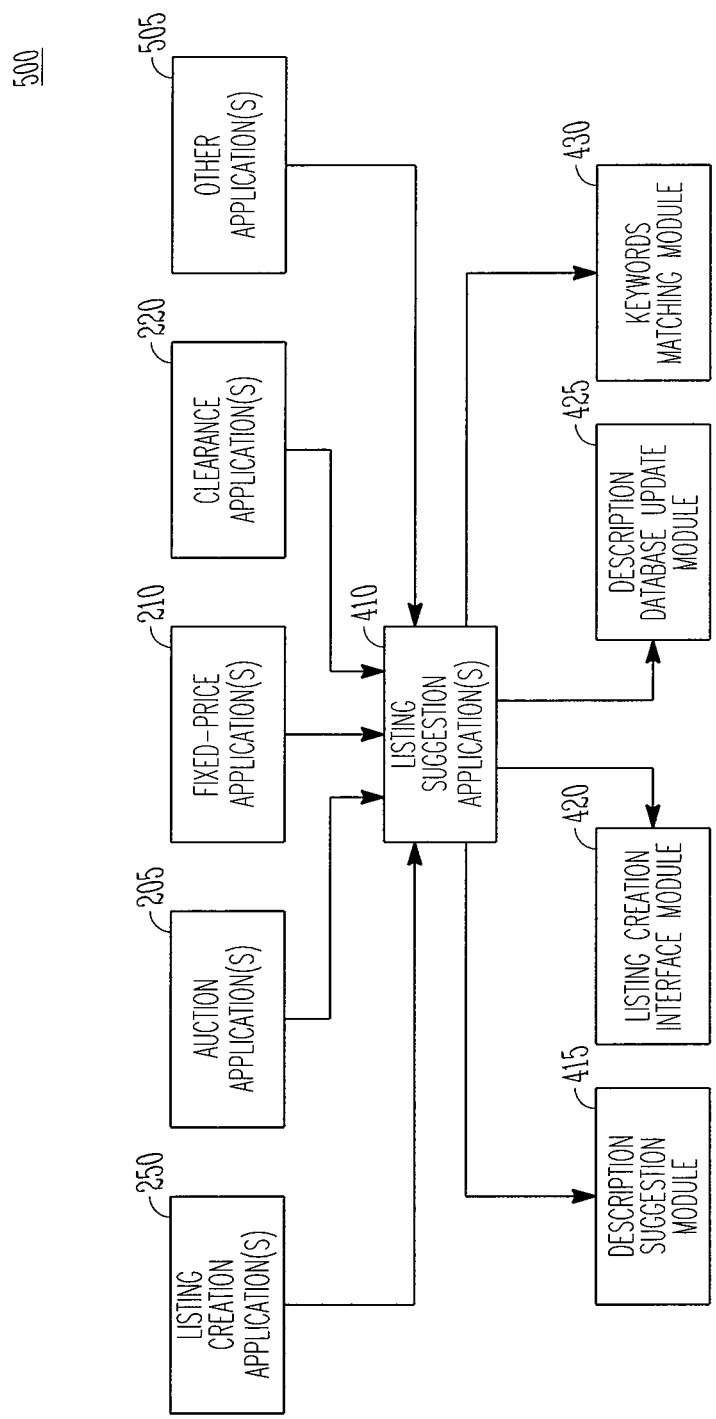
FIG. 5 is an example block diagram that illustrates various possible interactions among the different marketplace applications, in accordance with some example embodiments.

FIG. 5 is an example block diagram that illustrates various possible interactions among the different marketplace applications, in accordance with some example embodiments. The modules included in the listing suggestion applications 410 illustrated in FIG. 5 may be similar to the modules illustrated in FIG. 4. When the seller is satisfied with the description of the item, the seller may need to determine how the item may be listed. For some example embodiments, the item may be listed using a fixed price approach or it may be listed using an auction approach. The user/seller may also need to determine if the item is to be listed in a regular category, a clearance category, or some other categories. As illustrated, the listing suggestion applications 410 may be coupled with the auction applications 205, the fixed-price applications 210, the clearance applications 220, and the listing creation applications 250. Other applications 505 may also be coupled with the listing suggestion applications 410.

For some example embodiments, some operations of one or more modules in the listing suggestion applications may be combined or integrated with another module. For some example embodiments, the listing suggestion applications 410 may be coupled to other applications included in the marketplace applications 405 to enable the seller to list the item.

Process

Figure 6:
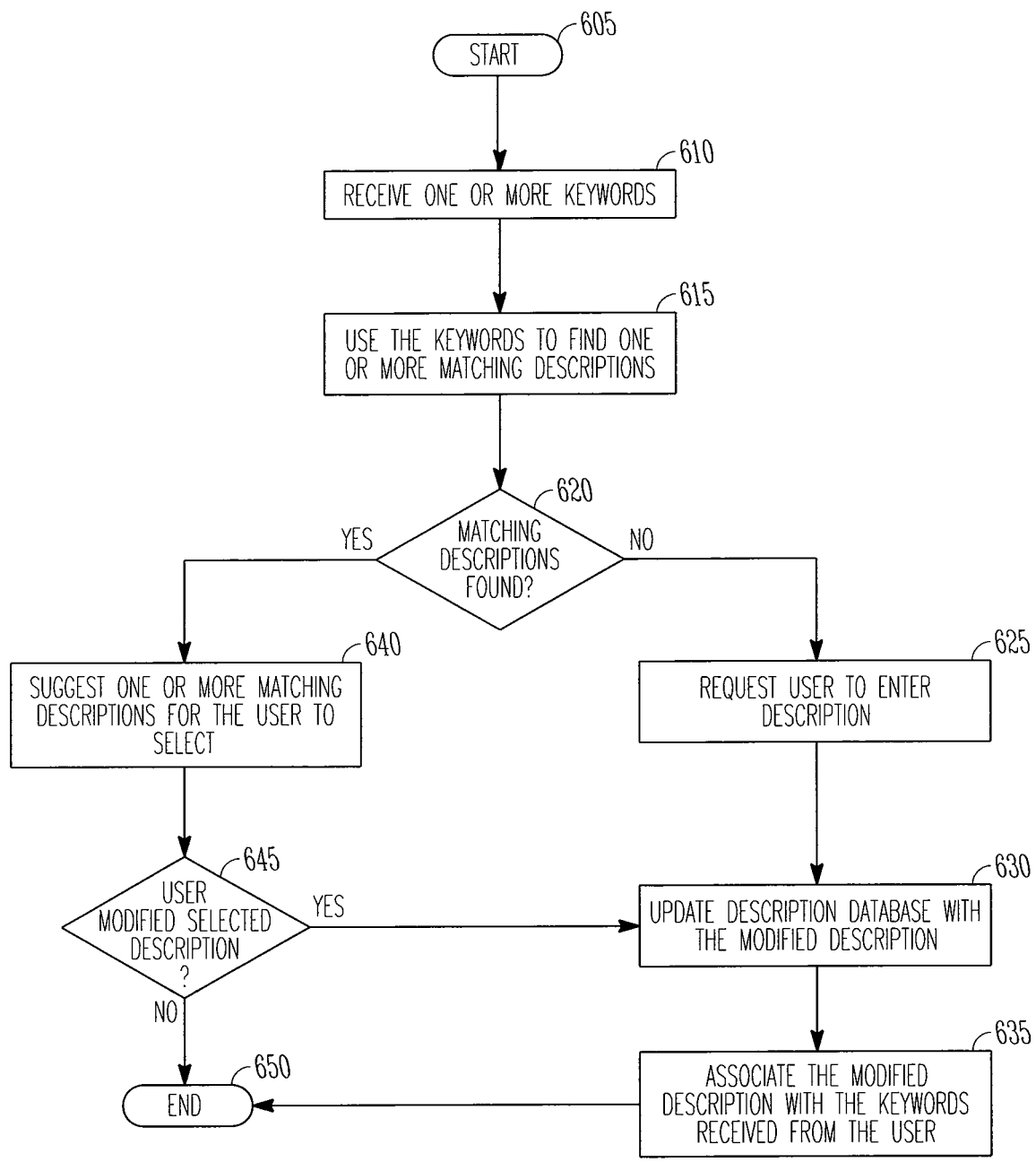
FIG. 6 illustrates an example process that may be used to implement the methods described, in accordance with some example embodiments.

FIG. 6 illustrates an example process that may be used to implement the methods described, in accordance with some example embodiments. The process may be performed by applications within the network-based marketplace 150. The applications may be the listing suggestion applications 410 described with the examples in FIG. 4 and FIG. 5. The process may be performed in response to an action performed by a seller. The process may start at block 605. At block 610, one or more keywords may be received via an interface. The keywords may be provided by a seller. The interface may be generated by the listing suggestion interface module 420. At block 615, the keywords received may be used to search for matching descriptions stored in a database. The database may include a keywords table and a description table as described in the example in FIG. 3B.

At block 620, it is determined whether one or more matching descriptions are found. For some example embodiments, the process of finding matching descriptions may include determining if a particular keyword may be found in the keywords table. When the keyword is found, the process may then determine the descriptions in the description table that includes the keyword. In some situations, there may be multiple matching descriptions. As more keywords are provided by the seller, the number of descriptions that include all of the keywords may decrease.

From block 620, if one or more matching descriptions are found, the process may continue to block 640 where the one or more matching descriptions may be presented to the user/seller. The seller may select one matching description. As described earlier, the one or more matching descriptions may be presented to the seller in a particular order. It may be possible that the seller may select a matching description that the ranking algorithm may suggest as the best matching description. It may be possible that the seller may select a matching description that is different from the one that the ranking algorithm suggests as the best matching description.

At block 645, it is determined whether the seller modifies the selected matching description. If modification is made, the process may continue to block 630 where the description table may be updated to include the modified version of the matching description. At block 635, the modified description in the description table may be associated with the keywords received from the seller. The process may end at block 650.

From block 645, if the matching description selected by the seller is not modified, the process may end at block 650.

From block 620, if no matching description is found in the description table, the process may continue to block 625 where the seller may be required to enter a new description. The process may then continue to block 630 described above. It may be noted when the keywords received from the seller are not found in the keywords table 355, these keywords may be inserted into the keywords table 355. Similarly, when there is a new description or a modified matching description, that description may be inserted into the description table.

Figure 7:
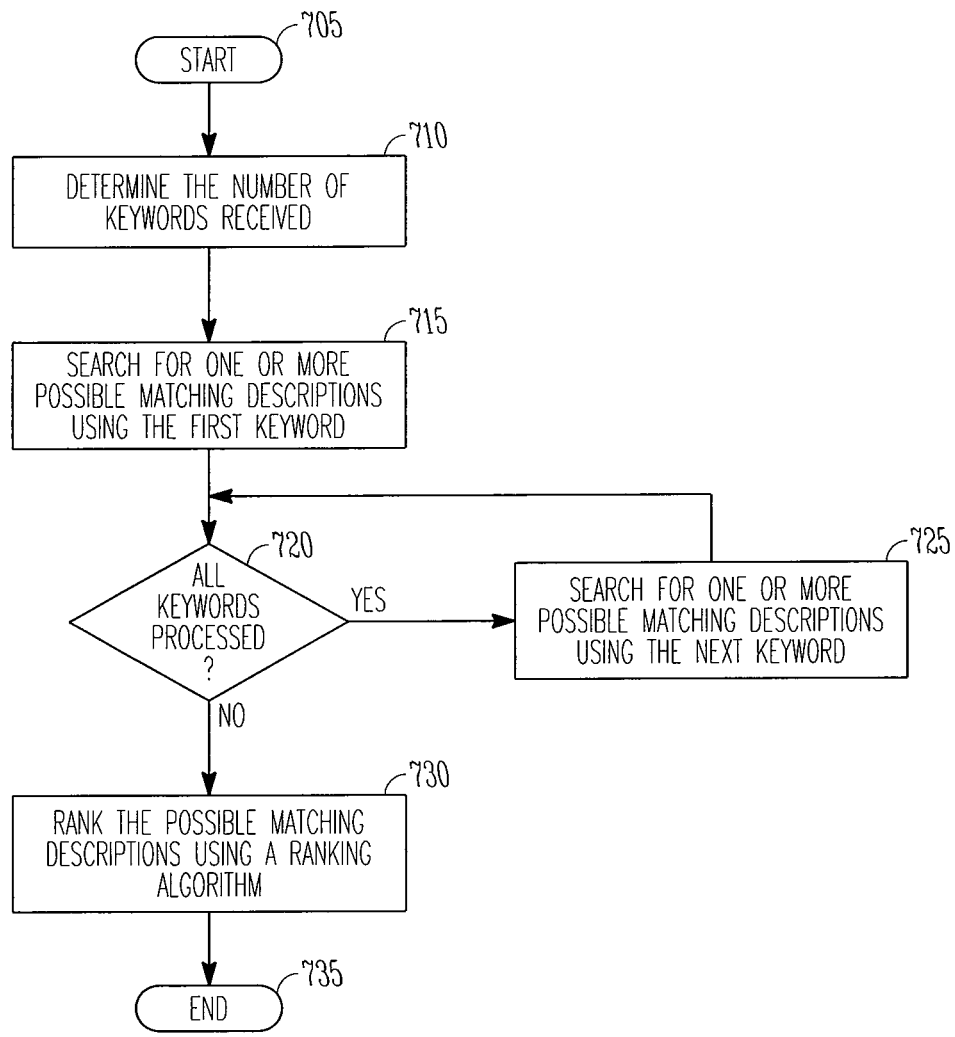
FIG. 7 illustrates an example process that may be used to search for matching information, in accordance with some example embodiments.

FIG. 7 illustrates an example process that may be used to search for matching information, in accordance with some example embodiments. The process may be related to the operations performed in block 620 illustrated in FIG. 6. The process may be used after the seller finishes entering all the keywords. For example, the search may start after the seller enters three keywords and then presses the "enter" key. The process may start at block 705. At block 710, the number of keywords received from the seller is determined. At block 715, the first keyword may be used to search for the matching descriptions. At block 720, it is determined if all of the keywords have been used to find the matching descriptions. If there is still more keywords to process, the operations performed in block 715 may be repeated in block 725 for the next keyword. These operations may continue until all of the keywords are processed, at which time the process may then continue to block 730.

At block 730, the ranking algorithm may rank the matching descriptions. For some example embodiments, the ranking algorithm may rank the matching descriptions based on the number of keywords included in each of the matching descriptions. For some example embodiments, the ranking may be based on keyword weight or other weight techniques. The matching descriptions may then be presented to the seller as described in block 640 of FIG. 6. The process of FIG. 7 may end at block 735.

For some example embodiments, operations associated with the listing suggestion applications 410 (e.g., suggestion interface, keywords matching, description suggestion, database update, etc.) may be written using a combination of one or more technologies that include, for example, Dynamic Hyper Text Markup Language (DHTML), Asynchronous JavaScript and XML (AJAX), FLASH™, HTML, Flex, Active X, Java applet technologies.

User Interface

Figure 8:
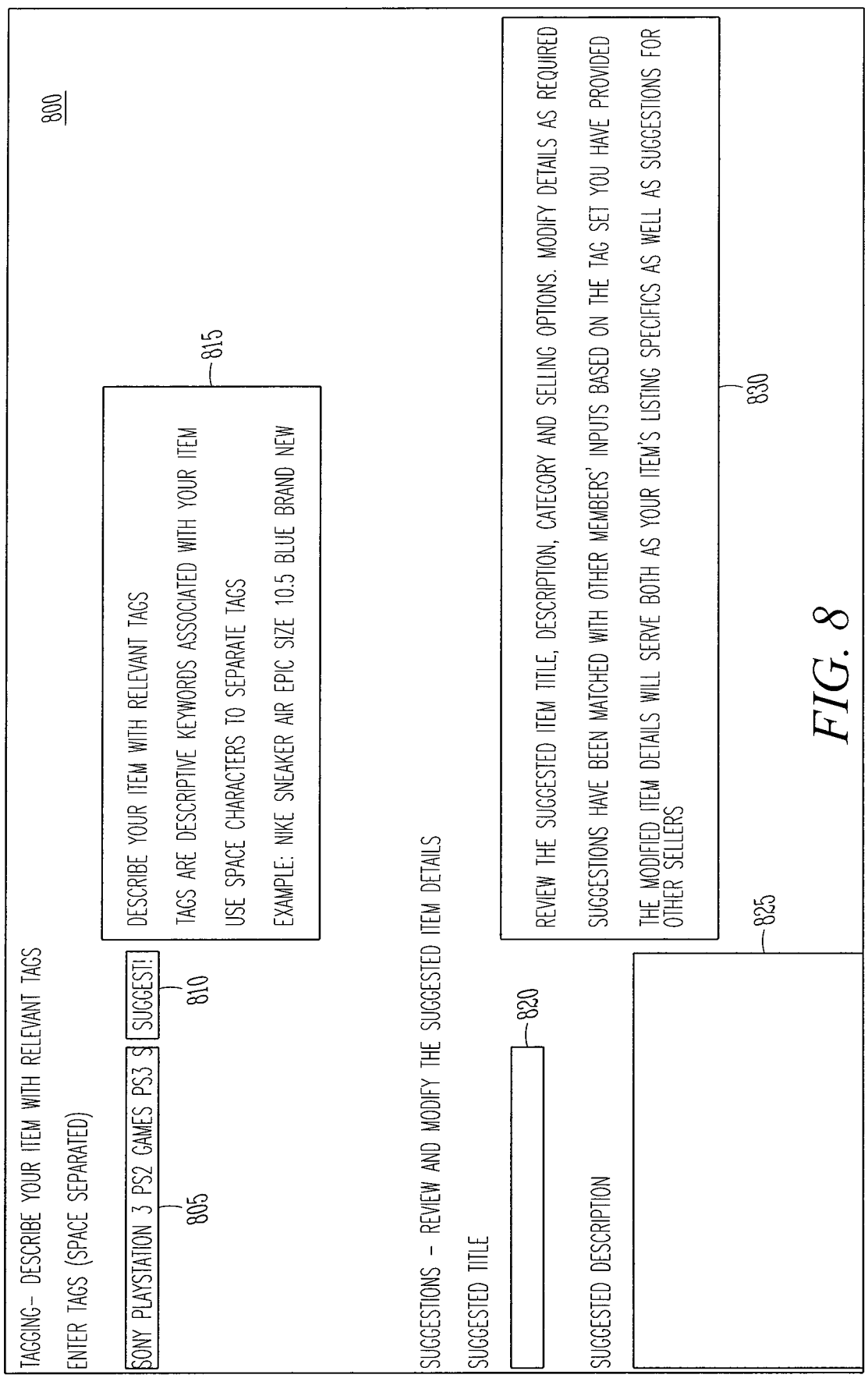
FIG. 8 illustrates an interface that may be used to suggest information, in accordance with some example embodiments.

FIG. 8 illustrates an interface that may be used to suggest information, in accordance with some example embodiments. Interface 800 may include keyword input area 805 to accept one or more keywords provided by the seller. The keywords may also be referred to generally as tags. There may be rules that the seller needs to follow to provide the keywords. Some rule examples are provided in a first informational display area 815. In this example, the seller may press the "Suggest!" button 810 to start getting the suggestions. The title suggestion may be presented in the title input area 820. The description suggestion may be presented in the description input area 825. Additional information may be presented to the seller using a second informational display area 830. Although not shown, the interface 800 may include other options to enable the seller to complete the process of listing the item.

Computer System

Figure 9:
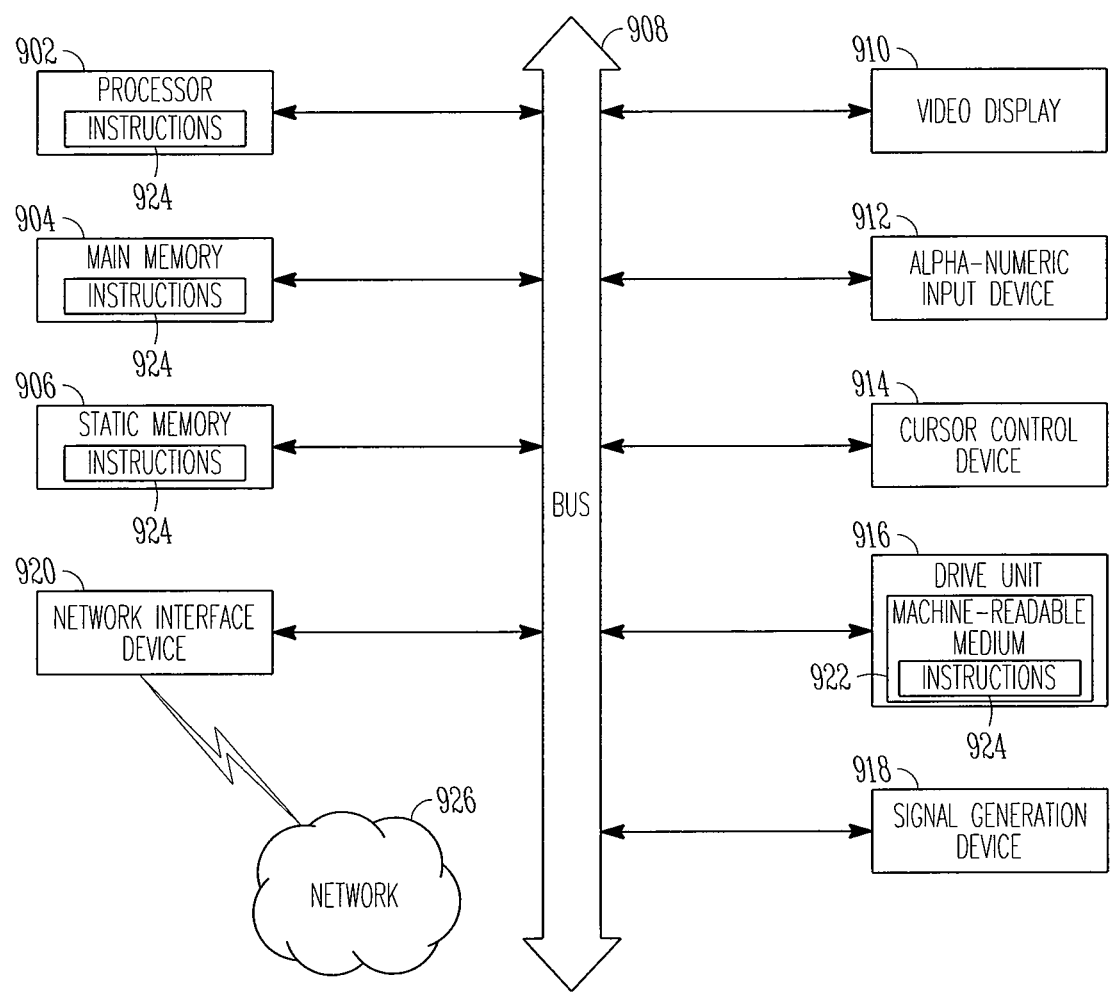
FIG. 9 illustrates an example diagram of a representation of a machine in the example form of a computer system that may be used, in accordance with some example embodiments.

FIG. 9 illustrates an example diagram of a representation of a machine in the example form of a computer system that may be used, in accordance with some example embodiments. Set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the current example, computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., liquid crystals display (LCD) or a cathode ray tube (CRT)). The computer system 900 also includes an input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software 924) embodying any one or more of the methodologies or functions described herein. The instructions 924 may also reside, completely or at least partially, within the main memory 904, the static memory 906, and/or within the processor 902 during execution thereof by the computer system 900. The main memory 904 and the processor 902 also may constitute machine-readable media.

The instructions 924 may further be transmitted or received over a network 926 via the network interface device 920.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, and optical and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure.

It may be appreciated that FIGS. 1-9 are merely representational and may not be drawn to scale. Certain proportions thereof may be exaggerated, while others may be minimized. Accordingly, the specification and drawings are to be regarded in an illustrative rather than a restrictive sense.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the description, with each claim standing on its own as a separate embodiment.

Thus, a method and system to suggest one or more of description information, title information, price information, and shipping information of items to be listed in an online commerce system and/or auction based system have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A method comprising:
   receiving one or more keywords describing an item to be listed in a publication on a network-based publication system;
   responsive to receiving the one or more keywords, searching, using one or more processors, for matching information using the one or more keywords, the information stored in a database;
   retrieving the matching information from the database, ranking multiple matching information, and suggesting the matching information according to an order based on the ranking to be used in generating the publication for the item;
   receiving a modification to the matching information to be used in generating the publication for the item;
   storing the modification to the matching information in the database to update the matching information retrievable from the database; and
   modifying a keywords table in the database, based upon the received one or more keywords.

2. The method of claim 1, wherein the matching information comprises at least one of description information, title information, price information and shipping information.

3. The method of claim 1, wherein the matching information is ranked according to a number of keywords associated with the matching information.

4. The method of claim 1, wherein the matching information is ranked according to a weighted value associated with each of the keywords.

5. The method of claim 1, wherein suggesting the multiple matching information according to an order based on said ranking comprises suggesting a subset of the multiple matching information.

6. The method of claim 1, further comprising:
   associating the modification to the matching information with the one or more keywords.

7. The method of claim 6, further comprising:
   requesting new information to be provided; and
   responsive to receiving the new information, storing the new information in the database.

8. The method of claim 7, further comprising:
   storing at least one of the one or more keywords in the database; and
   associating the new information with the keywords.

9. The method of claim 1, wherein suggesting the matching information to be used in generating the publication for the item comprises suggesting the matching information to be associated with a listing of the item.

10. The method of claim 1, wherein the item is to be listed in the network-based commerce system using a fixed price format or an auction price format.

11. A non-transitory computer readable storage medium containing instructions which, when executed by a processor of a system, causes operations comprising:
    receiving, one or more keywords describing an item to be listed in a publication on a network-based publication system;
    responsive to receiving the one or more keywords, searching, using one or more processors, for matching information using the one or more keywords, the information stored in a database;
    retrieving the matching information from the database, ranking multiple matching information, and suggesting the matching information according to an order based on the ranking to be used in generating the publication for the item;
    receiving a modification to the matching information to be used in generating the publication for the item;
    storing the modification to the matching information in the database to update the matching information retrievable from the database; and
    modifying a keywords table in the database, based upon the received one or more keywords.

12. A computer system, comprising:
    means for receiving one or more keywords describing an item to be listed in a publication on a network-based publication system;

means for searching for matching information using the one or more keywords, the information stored in a database;

means for retrieving the matching information from the database, ranking multiple matching information, and suggesting the matching information according to an order based on the ranking to be used in generating the publication for the item;

means for updating the suggested matching information retrieved from the database to include a modification to the suggested information based on the seller modifying the suggested matching information to be included in the publication generated using the retrieved suggested matching information; and means for modifying a keywords table in the database, based upon the received one or more keywords.

13. The computer system of claim 12, wherein the means for suggesting information comprises:

means for receiving the keywords provided by the seller; and means for finding the suggested information based on the keywords, wherein the suggested information is to include at least one of description information, title information, price information, and shipping information.

14. The computer system of claim 12, further comprising:

means for receiving new information for the item from the seller when there is no suggested information; and means for updating the database to include the new information.

15. The computer system of claim 14, further comprising:

means for updating the database to include the keywords based on the keywords not being included in the database; and means for associating the keywords with the new information.

16. An apparatus comprising:

a processor of a machine;

a listing suggestion interface module configured to receive one or more keywords describing an item to be listed in a publication on a network-based publication system;

a keyword matching module configured to search for matching information using the one or more keywords associated with the item, the information stored in a database;

a description suggestion module configured to retrieve the matching information from the database, rank multiple matching information, and suggest, using the processor of the machine, the matching information according to an order based on the ranking to be used in generating the publication for the item; and an update module coupled to the description suggestion module and configured to update the suggested matching information retrieved from the database to include a modification to the suggested matching information responsive to receiving seller modification of the suggested information and modifying a keywords table in the database, based upon the received one or more keywords.

* * * * *